United States Patent [19]
Saeed

[11] 3,888,758
[45] June 10, 1975

[54] APPARATUS FOR LARGE SCALE GEL ELECTROPHORESIS

[76] Inventor: Sheik Arshad Saeed, 9 Rostrevor Rd., London, S.W. 19, England

[22] Filed: June 28, 1973

[21] Appl. No.: 374,475

[52] U.S. Cl. ............................ 204/299; 204/180 G
[51] Int. Cl. ............................................. B01k 5/00
[58] Field of Search ..................... 204/180 G, 299

[56] References Cited
UNITED STATES PATENTS

| | | | |
|---|---|---|---|
| 3,129,158 | 4/1964 | Raymond et al. | 204/180 G |
| 3,346,479 | 10/1967 | Natelson | 204/180 G X |
| 3,375,187 | 3/1968 | Buchler | 204/180 G X |
| 3,384,564 | 5/1968 | Ornstein et al. | 204/180 G |
| 3,506,554 | 4/1970 | Broome | 204/180 G |
| 3,563,880 | 2/1971 | Anderson | 204/299 |
| 3,616,454 | 10/1971 | Levy et al. | 204/299 |
| 3,640,813 | 2/1972 | Nerenberg | 204/299 |
| 3,657,260 | 4/1972 | McLeester | 204/299 |
| 3,697,406 | 10/1972 | Svendsen | 204/299 |
| 3,719,580 | 3/1973 | Roberts et al. | 204/299 |
| 3,822,197 | 7/1974 | Nees et al. | 204/299 |

Primary Examiner—John H. Mack
Assistant Examiner—A. C. Prescott
Attorney, Agent, or Firm—Myron B. Sokolowski

[57] ABSTRACT

The subject matter of this invention is an apparatus for gel electrophoresis comprising: a housing providing a plurality of open ended parallel chambers for the receipt of gel; a porous support providing a closure for at least one end of each chamber; an electrode chamber adjacent each of the opposite ends of the gel chambers; an elution compartment located between one of the electrode chambers and an adjacent gel chamber end, the elution compartment being separated from the electrode chamber by a semi-permeable membrane and from the chamber end by a porous support; and means for feeding eluting liquid through the elution compartment.

11 Claims, 7 Drawing Figures 3,888,758

APPARATUS FOR LARGE SCALE GEL ELECTROPHORESIS

SUMMARY

This invention relates to apparatus for gel electrophoresis and is more especially concerned with the provision of an apparatus for enabling the results of analytical gel electrophoresis to be translated into larger scale preparative separation. In its preferred form, as later described in detail, the apparatus is useful for studying complex proteins or enzyme systems.

It has been found that excellent resolution can be obtained of protein mixtures by electrophoresis in polyacrylamide and starch gels in analytical work, but difficulties have arisen in the development of apparatus suitable for using such methods for dealing with materials in preparative quantities. Generally the technical difficulties which have arisen stem from problems in obtaining satisfactory elution, difficulties in mechanically stabilizing a large block of gel so that it does not collapse into a collecting chamber, difficulties in dissipating heat adequately and problems in maintaining a uniform electrical field geometry.

According to the present invention there is provided apparatus for gel electrophoresis comprising a housing providing a plurality of open ended parallel chambers for the receipt of gel, a porous support providing a closure for at least one end of each chamber, an electrode chamber adjacent each of the horizontally opposite ends of the gel chambers, an elution compartment located between one of the electrode chambers and an adjacent gel chamber end, the elution compartment being separated from the electrode chamber by a semi-permeable membrane and from the chamber end by a porous support, and means for feeding eluting liquid through the elution compartment. While an elution compartment can be provided common to a plurality of gel chambers, separate elution compartments may be provided for individual ones of the parallel gel receiving chambers should it be desirable to test different materials under identical conditions at the same time in the separate chambers.

Preferably elution liquid agitating or stirring means is provided in the elution compartment in order to provide consistent conditions therein, and a convenient form for this comprises a paddle and means for oscillating the paddle back and forth in the elution compartment. Suitably the elution compartment may comprise a sheet of methyl methacrylate or other plastic material having an aperture therethrough, one side of the aperture being closed by a porous sheet comprising the porous support and the other being closed by the semi-permeable membrane sandwiched between two perforated support plates.

Preferably elution compartments are provided at both ends of the gel chambers whereby anodic and cathodic conditions can be examined at the same time.

Suitably the means for cooling the gel chambers may comprise passages for cooling liquid in walls separating adjacent gel chambers. Preferably means are also provided for circulating cooled buffer liquid through the electrode chambers and the cooling passages.

Means such as a peristaltic pump may be provided for feeding the eluting buffer liquid through each elution compartment in a controlled manner to a fraction collector, an ultra-violet photometer being provided for recording the different components removed in the elution liquid.

DESCRIPTION OF THE PREFERRED EMBODIMENTS

The invention will be further described, by way of example, with reference to the accompanying drawings, in which.

Figure 1:
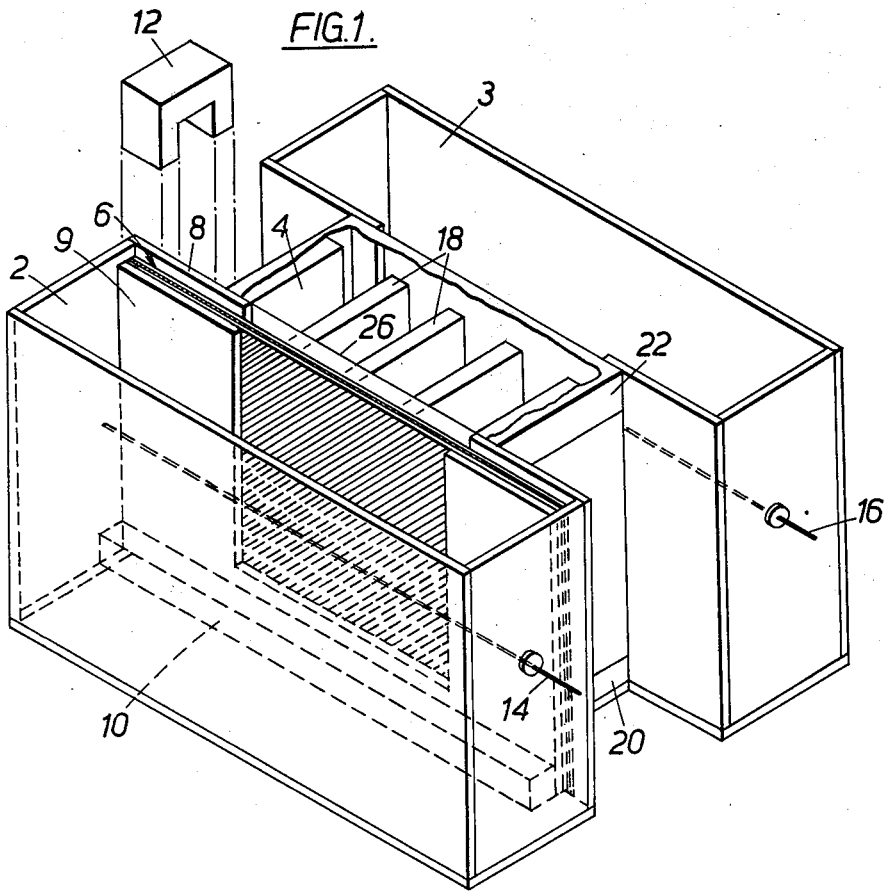
FIG. 1 is an isometric view illustrating the general arrangement of electrophoresis apparatus embodying the present invention.

Referring to the drawings there is shown in FIG. 1 apparatus comprising an anode chamber 2 and a cathode chamber 3 of generally similar construction. Extending horizontally between the chambers 2 and 3 are provided a plurality of spaced parallel vertical cooling walls 18 defining therebetween a plurality of open ended parallel chambers 4 for receipt of gel, each end of the gel chambers being separated from the adjacent electrode chamber by an eluting chamber 24 and a vertically disposed semi-permeable membrane assembly 6. The electrode chambers 2 and 3 are constructed of methyl methacrylate or other plastic material with the eluting chambers 24 each being formed by a cut-out portion of the vertical wall 8 of the respective electrode chamber adjacent the gel chambers. Each semi-permeable membrane assembly 6 is clamped against the associated wall 8 by means of a compression plate 9 held at its lower edge by a block 10 secured to the inside of the bottom of the electrode chamber and at the top by an inverted U-shaped retaining block 12 clamping the wall 8 and plate 9 together. While one block 12 is illustrated in FIG. 1 it will be appreciated that two such retaining blocks will be provided for each electrode chamber.

An anode 14 and a cathode 16 are illustrated extending into the anode and cathode chambers 2 and 3 respectively.

The gel chambers 4 are separated by vertical cooling walls 18 secured to a bottom cooling block 20. An upper cooling block 22 also is provided for resting on the top ends of the walls 18 whereby the top, bottom and side wall of each parallel gel chamber is constituted by a cooling wall or block.

Figure 2:
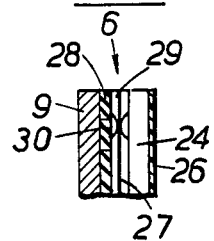
FIG. 2 is a detailed sectional view of the semi-permeable membrane arrangement employed in the apparatus of FIG. 1.
Figure 3:
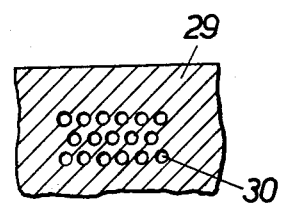
FIG. 3 is a fragmentary view showing perforations in the support plate for the semi-permeable membrane.

The opposite ends of the gel chambers 4 are closed by a pair of vertically extending porous polyethylene sheets 26 which form the inner walls of the eluting chambers 24 as shown in FIGS. 1 and 2. On the side of each eluting chamber 24 remote from the sheet 26 is provided the semi-permeable membrane assembly 6 which is formed by a semi-permeable dialysis membrane 27 made, for example, of cellophane and sandwiched between two membrane mounting plates 29 sealed to the compression plate 9 by means of a gasket 28. Conical holes 30 extend through the mounting plates 29 to provide for the contact of liquid with both sides of the dialysis membrane 27. The arrangement of holes 30 in the mounting plates 29 is illustrated in FIG. 3.

Figure 6:
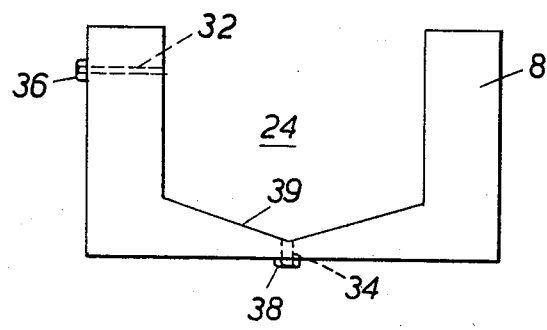
FIG. 6 is an elevational view of the sheet of methyl methacrylate or other plastic material used to form the eluting chamber.

The shape of an eluting chamber 24 is best seen from FIG. 6 wherein the elution chamber is shown as being formed by a cut-out section in a vertical plate 8. Holes 32 and 34 are shown extending through the plate 8 and are respectively provided with nipples 36 and 38. The bottom of the chamber 24 is of wide V-shaped form sloping towards the passage 34 as shown at 39 in FIG. 6.

Figure 7:
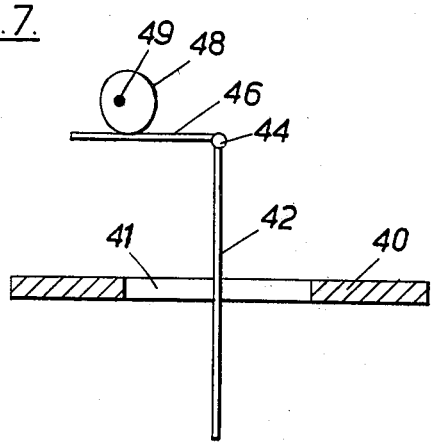
FIG. 7 diagrammatically illustrates a stirrer for use with the eluting chamber.

The top of the apparatus illustrated in FIG. 1 is adapted to be closed by a methyl methacrylate or other plastic lid 40 indicated in FIG. 7 which is provided with a slot 41 over each of the eluting compartments. Elution liquid agitating or stirring means in the form of a paddle 42 extends down through each of the slots 41 for receipt within respective eluting compartment, said paddles being carried by a rod 44 which is itself carried for oscillating movement by methyl methacrylate or other plastic brackets, not shown, carried by the cover 40. Means for oscillating the stirrer paddles 42 comprises an arm 46 secured to the rod 44 and displaceable therewith by an eccentric 48 rotatable by a shaft 49. A motor, not shown, is provided for rotating the shaft 49 to cause oscillation of the stirrer paddles 42 during use of the apparatus.

Figure 4:
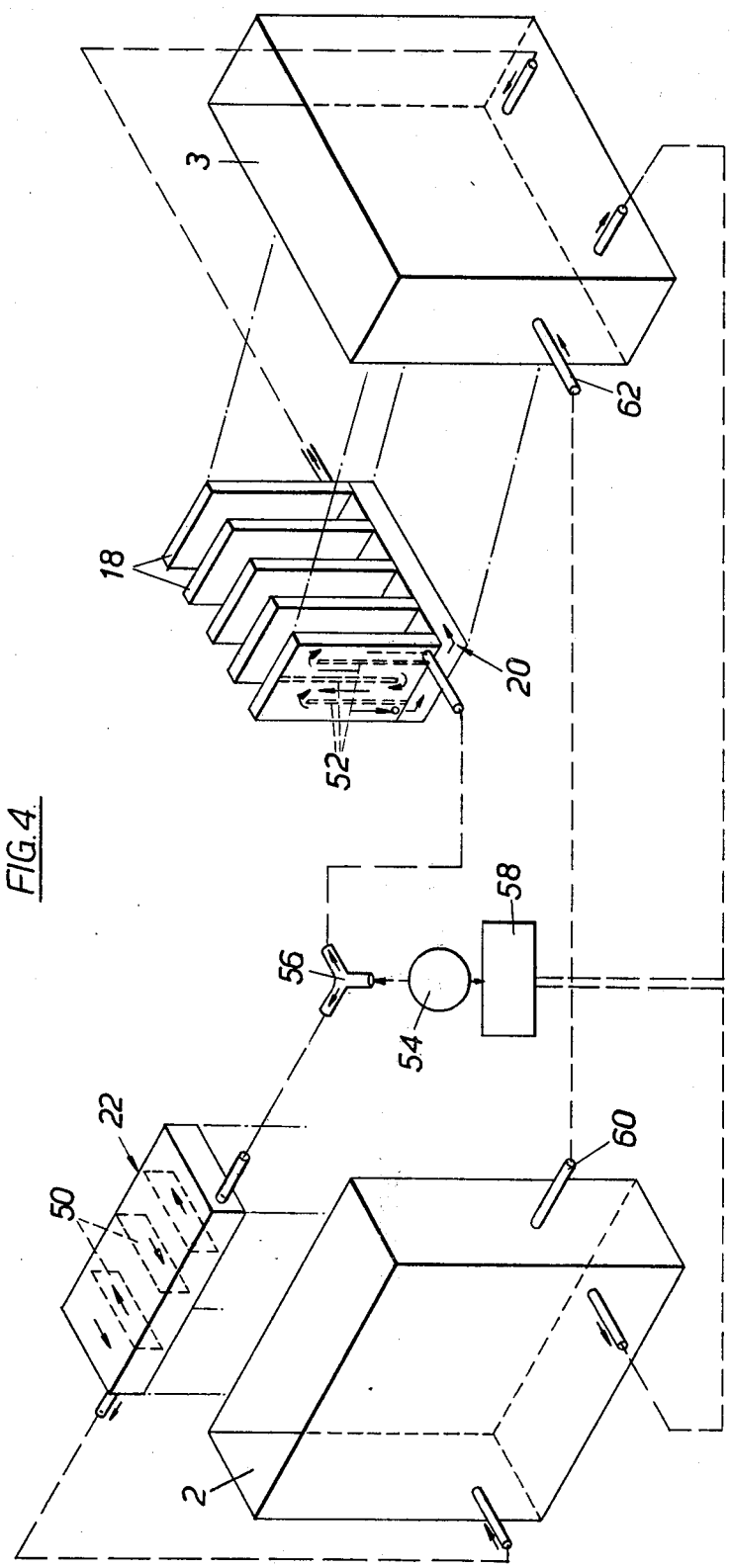
FIG. 4 is an exploded diagrammatic view illustrating the flow pattern of cooling liquid.

FIG. 4 illustrates the pattern for flow of cooling liquid through the lower and upper cooling blocks 20 and 22 and the cooling walls 18 of the gel chambers 4. In this Figure the top cooling block 22 is shown as being divided by baffles 50 so that liquid passed through the block will follow a serpentine path from end to end thereof. Similarly, baffles 52 are provided in each of the vertical cooling walls 18 and baffles, not shown, are also provided in the bottom cooling block 20 to ensure a serpentine flow of cooling liquid through the vertical walls 18 and the bottom cooling block 20. A pump 54 is provided for pumping the cooling liquid to a Y-piece 56 where the flow is divided, one section of the flow passing to the top cooling block 22 and from thence to the anode chamber 2 and the other portion of the liquid flow passing to the bottom cooling block 20 and vertical cooling walls 18 from whence it passes to the cathode chamber 3. From the cathode chamber the liquid flow passes to a temperature control core 58 from where it returns to the pump 54. In this Figure also suitable tubes 60 and 62 are shown for connection by a flexible tube for equalization of the liquid levels in the two electrode chambers 2 and 3.

Figure 5:
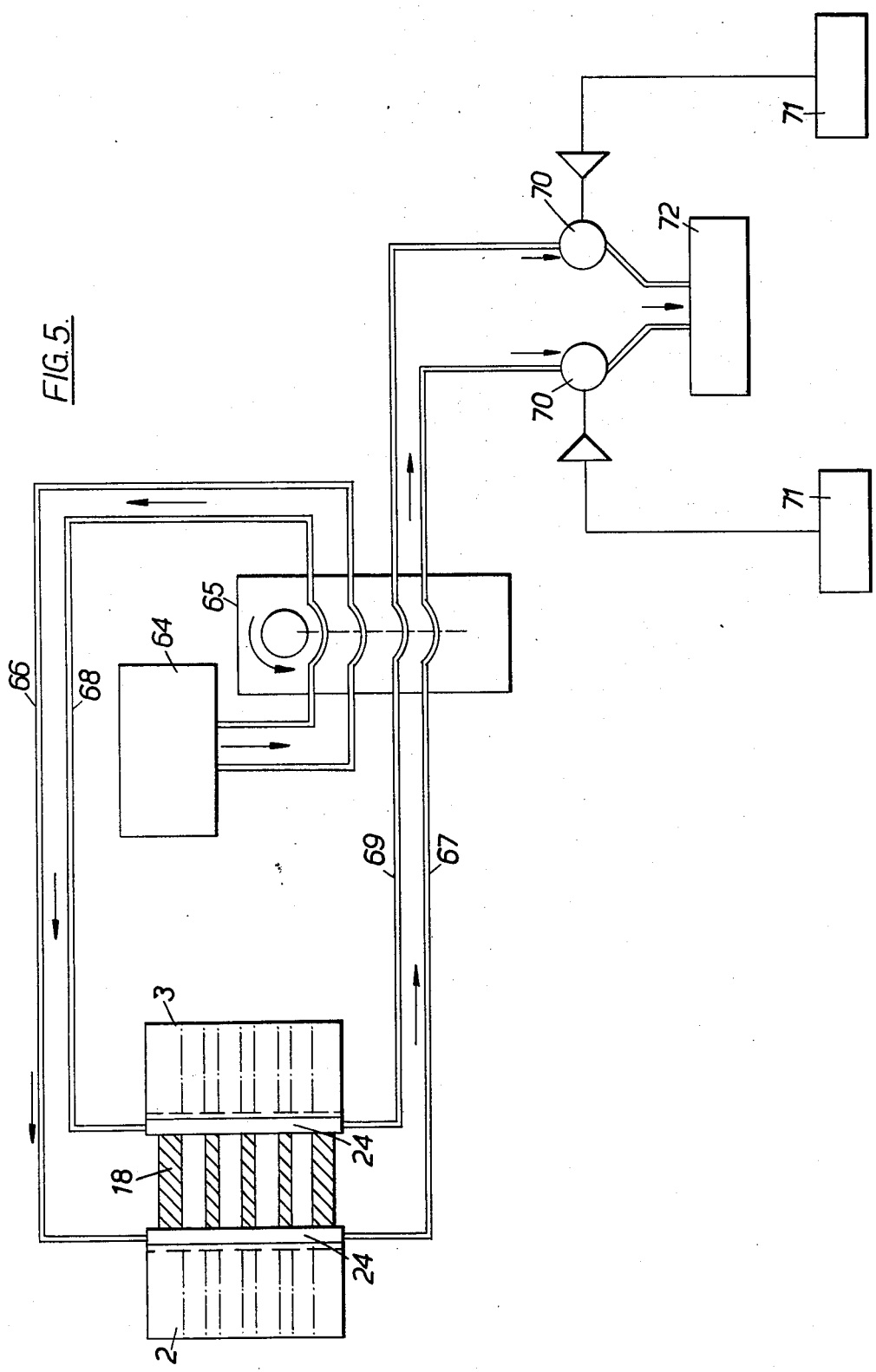
FIG. 5 is a diagrammatic view showing the flow pattern of eluting buffer liquid.

FIG. 5 shows a flow diagram for eluting buffer liquid in which eluting buffer liquid from a reservoir 64 is caused to flow by means of a metering peristaltic pump 65 through conduits 66 and 68 to elution chambers 24. The eluting buffer liquid is then passed through conduits 67 and 69 through the proportioning peristaltic pump 65 to ultra-violet photometers 70 from whence the flow passes to a fraction collector 72. Recorders 71 operated by the ultra-violet photometers 70 separately record the anodic and cathodic components in the flow passing to the fraction collector.

Generally flexible tubes are used to conducting eluting and cooling liquid between the various components, the components themselves being fitted with nipples, for receiving the tubing.

As indicated above a thin plate or sheet 26 of porous polyethylene is secured to close the ends of the gel chambers. Suitably the vertical and bottom walls of the gel chambers can be formed of methyl methacrylate (or other plastic material) with the porous polyethylene plate being cemented with cyanoacrylate to these walls.

While one form of the methyl methacrylate or other plastic plate defining the elution chamber 24 is illustrated in FIG. 6, in an alternative form, instead of having the inlet for eluting buffer liquid 32 through the methyl methacrylate or other plastic plate the inlet may be provided from above through the removable lid 40 which also provides a mounting for the stirrers.

In order to use the apparatus gel solution is supplied to the gel chambers and a former (not shown) having downwardly depending members is provided as a lid so that following setting or polymerization of the gel the former can be removed to leave slots extending downwardly into the gel from the upper surface thereof at a suitable location in the individual gel chambers for receipt of the material to be tested. During supply of gel to the gel chambers, the gel is drawn into the pores of the porous polyethylene sheets or plates 26 during casting and is thus anchored to said sheets or plates. A suitable gel separation medium is polyacrylamide, as gels of this material are transparent and chemically inert; they can be varied over a wide range of concentration and pore sizes, thus taking advantage of any differences in molecular size or shape as well as charge differences; furthermore, polyacrylamide gels can be polymerized in the presence of many solubilizing agents, such as urea or non-ionic detergents, and over a wide range of pH, thus permitting solutions and separation of even structural proteins which are as difficult to dissolve as those of viruses, ribosomes and mitochondria and isoenzymes. When the gel solution is added to the chambers, care is taken to avoid trapping air bubbles within the gel solution. For varying the dimensions of the slots in the gel as required, different slot forms can be used as each slot former is relatively cheap to produce, comprising a piece of methyl methacrylate or other plastic material having cemented thereto four downwardly depending pieces of methyl methacrylate or other plastic material for receipt in the individual gel chambers. Once the slots have been formed, samples can be supplied to the slots, conveniently in agarose gel to prevent electrodecantation.

The electrical potential for electrophoresis is applied across the cathode and anode, and during electrophoresis, charged molecules migrate from the sample slot through the separative medium, preferably polyacrylamide gel as indicated above, to the buffer filled elution compartments. Simultaneously buffer is pumped sequentially through the elution compartments 24 to the monitoring ultraviolet photometers 70 and the fraction collector 72. During use of the apparatus the buffer in the eluting chambers is stirred by the stirring paddles to prevent electrodecantation which could lead to distortion of the electrical field and thus affect the resolution both in the gel and the eluate, and also to prevent absorption of proteins and the like into the semipermeable membranes 27. Because double ended elution is provided, both anionic and cationic species can be isolated at one time.

However, if elution of only one species is desired, the elution chamber 24 normally providing the other species can be dispensed with. While the construction described has been used for treating amounts of protein up to 4 grams, in an alternative arrangement, by designing the plates 8 so as to provide an elution chamber or compartment for each gel chamber and by supplying separate streams of eluting buffer through the individual elution chambers, tests can be carried out simultaneously on different materials in each of the gel chambers under identical conditions for obtaining comparative results.

Thus, when providing for separate collections of eluting buffer for the individual gel chambers it is possible to study four different protein/enzymes in isolation under identical conditions during the course of a single experiment.

While four gel chambers have been illustrated it will be appreciated that the capacity of the apparatus can be increased simply by building in additional gel chambers, all based on the same principle of design as outlined above with proper circulatory provision for cooling liquid.

As an example of use of the apparatus a two gram mixture of bovine plasma albumin and haemoglobin-A was fractionated. The buffer used was 0.09 M Tris, 0.002 M EDTA $Na_2$ and 0.089 M $H_3BO_3$ having a pH of 8.3. Each of the four gels comprised a 5.5% concentration of polyacrylamide, were 7.2 cm long, 2.4 cm wide and 8.0 cm deep. The sample slot was 1.8 cm. long by 0.3 cm wide and 7.6 cm deep; it was cast at 3.5 cm from the anodic end of the gel bed, the width in the electrophoresis axis being 0.3 cm. The flow rate of eluting buffer was 50 ml/hour and the voltage gradient was 7 volts/cm, the temperature during electrophoresis being maintained at 4°C. Prior to the addition of the sample to the gel all the gels were pre-run for 1½ hours at 7 volts/cm, the samples being applied in 0.5 agarose (final concentration). The temperature was kept constant by the use of the temperature control coil 58 which comprised a glass coil through which the cooling buffer was flowed, the coil being immersed in a temperature control bath. In apparatus as described, the fractions of the samples introduced into the sample slots flow in a horizontal direction from the sample slots through the gel toward the respective electrode in accordance with their respective charges and hence to the elution chambers associated with the respective electrodes.

What is claimed is:

1. In apparatus for gel electrophoresis, the combination comprising:
   wall means defining at least one gel chamber;
   an electrode chamber adjacent one end of said gel chamber;
   an elution compartment connected between said gel chamber and electrode chamber;
   means for causing an eluting liquid to flow through said elution compartment;
   and means for agitating the eluting liquid in said elution compartment.

2. In apparatus according to claim 1, wherein the elution compartment comprises:
   a sheet of plastic having an aperture therethrough; the aperture being defined by upright parallel walls and a V shaped bottom; the bottom sloping toward a passage extending through the elution compartment to provide an outlet for eluting liquid; and means for introducing eluting liquid to said compartment.

3. In apparatus for gel electrophoresis having walls defining at least one gel chamber,
   an electrode chamber adjacent one end of said gel chamber,
   a liquid electrolyte in said electrode chamber,
   said walls being provided with fluid flow passage means therein,
   wherein the improvement comprises: means for circulating said electrolyte through said passage means for cooling said gel chambers therewith.

4. In apparatus for gel electrophoresis having
   a horizontal bottom and vertical side walls defining a gel chamber having an open end,
   an elution compartment closing said open end of said gel chamber,
   a gel substantially filling said gel chamber,
   wherein the improvement comprises:
   said gel being formed with a slot-like sample receiving opening extending downwardly thereinto from the upper surface thereof at a point spaced from said elution compartment.

5. In apparatus for gel electrophoresis, the combination comprising:
   wall means defining a plurality of gel chambers;
   an electrode chamber adjacent one end of said gel chambers;
   and a common elution compartment connected between one end of each of said gel chambers and said electrode chamber.

6. Apparatus for gel electrophoresis comprising:
   a housing providing a plurality of open ended parallel chambers for the receipt of gel;
   an electrode chamber adjacent each of the opposite ends of the gel chambers;
   an elution compartment located at each end of each gel chamber between one of the electrode chambers and an adjacent gel chamber end, each such elution compartment being separated from the adjacent electrode chamber by a semipermeable membrane and from the adjacent gel end by a porous sheet;
   a stirrer positioned in each elution compartment;
   and means for feeding eluting liquid through the elution compartment.

7. Apparatus according to claim 6 wherein an elution compartment is provided common to a plurality of gel chambers.

8. Apparatus according to claim 6 wherein the stirrer comprises a paddle and means for oscillating the paddle back and forth in the elution compartment.

9. Apparatus according to claim 8 wherein the means for oscillating the paddle back and forth in the elution compartment comprises:
   a motor;
   an eccentric rotated by the motor;
   an arm displaceable at one end by the eccentric and secured at the other end to a rod connecting the stirrer paddle to cause oscillation of the stirrer paddle in the elution compartment.

10. Apparatus according to claim 6, wherein the housing providing a plurality of open ended parallel chambers for the receipt of gel consists of a plurality of vertical spaced cooling walls secured to a bottom cooling block and having an upper cooling block capable of resting on the top ends of the vertical spaced walls, each of said vertical spaced cooling walls, bottom cooling block and upper cooling block containing internal conduit passages for the passage therethrough of cooled liquid electrolyte; wherein means are provided for circulating cooled liquid electrolyte through each of the electrode chambers; and wherein means are provided for circulating the same cooled liquid electrolyte sequentially through the electrode chambers, the vertical cooling walls, and the lower and upper cooling blocks.

11. Apparatus according to claim 6 having gel substantially filling said gel chambers wherein said gel is formed with a slot-like sample receiving opening extending downwardly thereinto from the upper surface thereof at a point spaced along the length of each chamber.

* * * * *